June 19, 1928. 1,674,410
A. W. NORDGREN ET AL
BUMPER
Filed Dec. 27, 1927
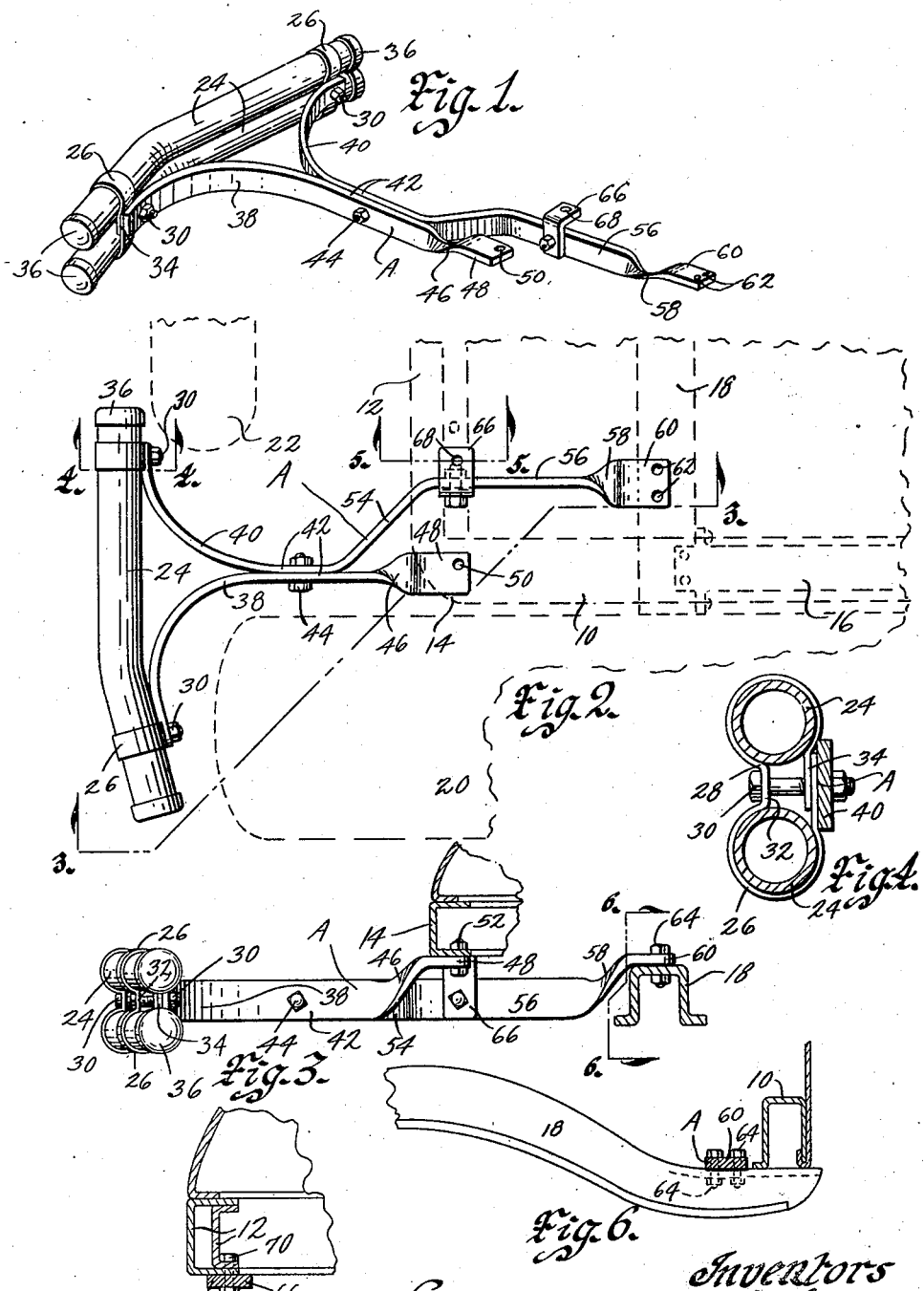

Patented June 19, 1928.

1,674,410

UNITED STATES PATENT OFFICE.

ALGOT W. NORDGREN AND GUSTAV A. BURANDT, OF ST. PAUL, MINNESOTA, ASSIGNORS TO MARQUETTE MANUFACTURING COMPANY, OF ST. PAUL, MINNESOTA.

BUMPER.

Application filed December 27, 1927. Serial No. 242,557.

The object of our invention is to provide a bumper commonly known as a quarter bumper or fender guard for protecting the rear fenders of an automobile, the parts being simple, durable and comparatively inexpensive to manufacture and easy to install upon an automobile.

More particularly our invention relates to a bumper for protecting the rear fenders of automobiles and includes supporting members for the bumper elements which are particularly adapted to coact with the 1928 type Ford automobile.

Still a further object is to provide a support for the bumper which is adapted to be secured at two spaced points to the body frame of the automobile and at a third point to the chassis frame of the automobile.

With these and other objects in view, our invention consists in the construction, arrangement and combination of the various parts of our bumper construction, whereby the objects contemplated are attained, as hereinafter more fully set forth, pointed out in our claims and illustrated in the accompanying drawings, in which:

Figure 1 is a perspective view of our improved bumper.

Figure 2 is a top plan view of the same with parts of the automobile body indicated therewith.

Figure 3 is a sectional view taken on the line 3—3 of Figure 2.

Figure 4 is a sectional view taken on the line 4—4 of Figure 2 illustrating the split ring member for connecting the bumper elements together.

Figure 5 is a detail sectional view taken on the line 5—5 of Figure 2; and

Figure 6 is a sectional view taken on the line 6—6 of Figure 3 illustrating the cross member of the chassis and the connection with the bumper support thereto.

In the accompanying drawings, we have used the reference character 10 to indicate generally the side body frame and 12 the rear cross body frame. The frame members 10 and 12 are connected together by an end piece 14 which is curved and which is also channel shaped in cross section.

The entire body frame of the automobile rests upon the chassis formed of a side frame member 16 and a rear cross frame member 18. The frame members 16 and 18 form the car frame or chassis and are connected together. The chassis cross frame 18 is substantially channel shaped in cross section as clearly illustrated in Figure 3 of the drawings.

On the side of the car body and connected thereto, is a rear mud guard or fender 20 which is adapted to be protected by our bumper which we will hereinafter more fully describe.

The position of a spare tire 22 is clearly illustrated in Figure 2 of the drawings. Our improved bumper is preferably formed of a pair of tubular bumper elements 24 which are connected together by a pair of split ring elements 26. The split ring elements 26 are each formed with tubular portions for receiving the tubular bumper elements 24.

Between the two tubular portions of the split rings 26, we provide a space 28 wherein a bolt 30 may be extended through portions of the split ring 26 for connecting the bumper elements to proper supports and at the same time to fasten or tighten the split rings around each of the tubular bumper elements 24.

A short connecting piece 32 spaces the two tubular portions from each other and defines a portion through which the bolts may be extended. The split ring 26 is formed with overlapping ends as at 34 through which the bolt 30 also extends.

It will be noted that when the bolt 30 has been tightened, that the overlapping ends are drawn towards the connecting portion 32 wherein the split ring will be tightly held upon the tubular elements 24. The ends of the tubular bumper elements are capped with small caps 36 for appearance sake.

Each bumper includes a bumper support or fitting A wherein the bumper elements may be properly positioned rearwardly of the rear fenders and properly connected to the automobile body and frame. The support A includes two strap like elements 38 and 40. Both of the elements 38 and 40 are connected to the split rings 26 by means of the bolts 30.

The two elements 38 and 40 project towards each other and include substantially parallel portions 42 through which may be extended a bolt or the like 44 whereby the two elements are connected together. The bolt 44 serves in connection with the bolt 30 of each of the bumper elements to properly position the support A relative to the bumper elements 24.

The rear or inner end of the portion 42 of the element 38 is turned a quarter turn as at 46 for providing a flat horizontal end 48 which is provided with an opening 50. The end 48 projects up a short distance above the normal level of the element 38 as clearly shown in Figure 3 of the drawings and is conected to the end piece of the body frame by means of a bolt or the like 52.

The bolt 52 extends through an opening formed in the channel shaped end piece 14 and through the opening 50 in the end 48. The element 40 which forms a part of the entire support A has an offset or inwardly and forwardly inclined portion 54 which then terminates in a straight portion extending forwardly as at 56.

The rear end of the portion 56 is provided with a quarter bend or turn 58 so that a flat horizontal end 60 is also formed upon the inner end of the member or element 40. The end 60 is provided with a pair of openings 62 through which bolts 64 may be extended.

The end 60 rests upon the chassis cross frame member 18 and the openings thereof register with openings formed in the cross frame 18 so that the bolts 64 may be used for securely anchoring the inner end of the member 40 to the automobile chassis.

The portion 56 of the member 40 has connected to it an angle bracket 66. The angle bracket may be riveted or bolted to the portion 56 and provides a short offset extension which is adapted to fit up against the underside of the rear cross body frame 12. The angle bracket 66 is provided with a small opening 68 through which a bolt or the like 70 may be extended for connecting the angle bracket to the rear body cross frame 12.

It will be noted therefore, that the support A is connected at two spaced points to the body frame and at a third point to the chassis proper. The connections are spaced apart so that a three point connection between the bumper support A and the automobile is had wherein the parts may be securely anchored to the automobile and will withstand the necessary hard usage to which a bumper is subjected.

Some changes may be made in the construction and arrangement of the parts of our device without departing from the real spirit and purpose of our invention, and it is our intention to cover by our claims, any modified forms of structure or use of mechanical equivalents, which may be reasonably included within their scope.

We claim as our invention:

1. A bumper for automobiles comprising a pair of vertically spaced tubular bumper elements, spaced fastening means for connecting said bumper elements in spaced relationship and means for supporting said bumper elements on the frame of an automobile, said means including a pair of members each having parts connected to said fastening means and projecting towards each other and having parts arranged parallel to each other and connected together, one of said members being of greater length than the other and having connection with the automobile frame at a point spaced from and independent of the other of said members.

2. A bumper for automobiles comprising a pair of vertically spaced tubular bumper elements, spaced fastening means for connecting said bumper elements in spaced relationship and means for supporting said bumper elements on the frame of an automobile, said means including a pair of members each having parts connected to said fastening means and projecting towards each other and having parts arranged parallel to each other and connected together, one of said members being of greater length than the other and having connection with the automobile frame at a point spaced from and independent of the other of said members, the ends of said members being twisted to provide horizontal end portions.

3. A bumper for automobiles comprising a pair of vertically spaced tubular bumper elements, spaced fastening means for connecting said bumper elements in spaced relationship and means for supporting said bumper elements on the frame of an automobile, said means including a pair of members each having parts connected to said fastening means and projecting towards each other and having parts arranged parallel to each other and connected together, one of said members being of greater length than the other and having connection with the automobile frame at a point spaced from and independent of the other of said members, an angle clip secured to the longer of said members between the ends thereof for connection with the automobile frame at a point spaced from the ends of said pair of members.

4. A bumper for automobiles comprising a pair of vertically spaced tubular bumper elements, spaced fastening means for connecting said bumper elements in spaced relationship and means for supporting said bumper elements on the frame of an automobile, said means including a pair of members each having parts connected to said fastening means and projecting towards each other and having parts arranged parallel to each other and connected together, one of said members being of greater length than the other and having connection with the automobile frame at a point spaced from and independent of the other of said members, an angle clip secured to the longer of said members between the ends thereof for connection with the automobile frame at a point spaced from the ends of said pair of members, the ends of said members having openings therein for receiving bolts for providing means of connection with the automobile frame whereby said bumper is connected to the automobile frame at three spaced points.

5. A bumper for automobiles comprising a pair of vertically spaced tubular bumper elements, spaced fastening means for connecting said bumper elements in spaced relationship and means for supporting said bumper elements on the frame of an automobile, said means including a pair of members each having parts connected to said fastening means and having parts connected together, one of said members having a portion thereof offset from the other of said members for spacing the ends of said member and means for connecting the ends of said members to the automobile frame at two spaced points.

6. A bumper for automobiles comprising a pair of vertically spaced tubular bumper elements, spaced fastening means for connecting said bumper elements in spaced relationship and means for supporting said bumper elements on the frame of an automobile, said means including a pair of members each having parts connected to said fastening means and having parts connected together, one of said members having a portion thereof offset from the other of said members for spacing the ends of said members and means for connecting the ends of said members to the automobile frame at two spaced points, the member having the offset therein being of greater length than the other of said members.

7. A bumper for automobiles comprising a pair of vertically spaced tubular bumper elements, spaced fastening means for connecting said bumper elements in spaced relationship and means for supporting said bumper elements on the frame of an automobile, said means including a pair of members each having parts connected to said fastening means and having parts connected together, one of said members having a portion thereof offset from the other of said members for spacing the ends of said members, the member having the offset therein being of greater length than the other and having two spaced connections with the automobile frame independent of the other of said members and said other member having connection with the automobile frame at a point spaced from the other two of said connections.

Des Moines, Iowa, December 21, 1927.

ALGOT W. NORDGREN.
GUSTAV A. BURANDT.